(12) United States Patent
Muquit et al.

(10) Patent No.: US 9,031,315 B2
(45) Date of Patent: May 12, 2015

(54) INFORMATION EXTRACTION METHOD, INFORMATION EXTRACTION DEVICE, PROGRAM, REGISTRATION DEVICE, AND VERIFICATION DEVICE

(75) Inventors: Mohammad Abdul Muquit, Kanagawa (JP); Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 1233 days.

(21) Appl. No.: 12/528,540

(22) PCT Filed: Feb. 25, 2008

(86) PCT No.: PCT/JP2008/053714
§ 371 (c)(1),
(2), (4) Date: Aug. 25, 2009

(87) PCT Pub. No.: WO2008/105548
PCT Pub. Date: Sep. 4, 2008

(65) Prior Publication Data
US 2010/0098299 A1  Apr. 22, 2010

(30) Foreign Application Priority Data
Feb. 26, 2007  (JP) ................ 2007-046091

(51) Int. Cl.
*G06K 9/00*  (2006.01)
*G06T 7/00*  (2006.01)

(52) U.S. Cl.
CPC .......... *G06T 7/0067* (2013.01); *G06K 9/00013* (2013.01); *G06K 9/00375* (2013.01); *G06K 2009/00932* (2013.01); *G06T 2207/10048* (2013.01); *G06T 2207/30196* (2013.01)

(58) Field of Classification Search
CPC ............... G06K 2009/00932; G06K 9/00013; G06K 9/00885; G06K 9/00; G06K 9/00033; G06K 9/20
USPC ......... 382/115, 154, 190, 201, 203, 204, 124, 382/126
See application file for complete search history.

(56) References Cited

U.S. PATENT DOCUMENTS

| 8,190,239 B2* | 5/2012 | Endoh et al. ............ 600/473 |
| 2002/0048014 A1* | 4/2002 | Kono et al. ............... 356/71 |
| 2003/0108223 A1* | 6/2003 | Prokoski ................. 382/115 |
| 2005/0047632 A1* | 3/2005 | Miura et al. ............. 382/124 |
| 2007/0286462 A1* | 12/2007 | Usher et al. ............. 382/115 |

FOREIGN PATENT DOCUMENTS

| JP | 10-307919 | 11/1998 |
| JP | 2002-175529 | 6/2002 |

(Continued)

OTHER PUBLICATIONS

Office Action, Japanese Application No. 2007-036766, issued Aug. 7, 2012, 3 pages.

*Primary Examiner* — Kim Vu
*Assistant Examiner* — Michael Vanchy, Jr.
(74) *Attorney, Agent, or Firm* — Finnegan, Henderson, Farabow, Garrett & Dunner, L.L.P.

(57) ABSTRACT

An information extraction method, an information extraction device, a program, a registration device, and a verification device that improve authentication accuracy simultaneously with reduction of the amount of information concerning an identification target are proposed. From a plurality of first images obtained from viewpoints in surroundings of a living body portion, common portions of silhouettes of the living body portion that is shown in the images are generated as a first stereoscopic image in a target space. From a plurality of second images obtained from the viewpoints in the surroundings of the living body portion, common portions of silhouettes of an inner surface image of the living body portion that is shown in the images are generated as a second stereoscopic image in the target space. A value representing a shape of a cross section of the second stereoscopic image that has a predetermined positional relationship with respect to a reference position of the first stereoscopic image is extracted as an identification information item.

12 Claims, 22 Drawing Sheets

(56) References Cited

FOREIGN PATENT DOCUMENTS

| JP | 2003-67726 | 3/2003 |
| JP | 2003-070021 | 3/2003 |
| JP | 2003-93369 | 4/2003 |
| JP | 2004-070792 | 3/2004 |
| JP | 2007-219 | 1/2007 |

* cited by examiner

FIG. 5
(A)
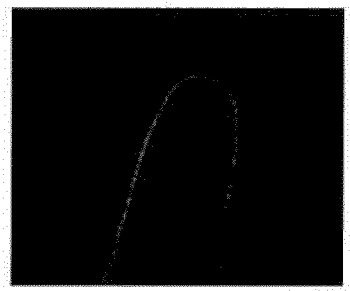
(B)
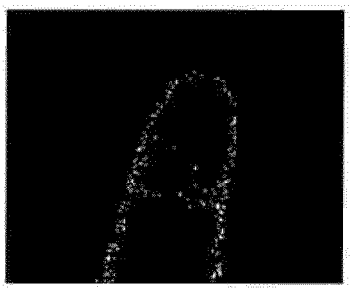
(C)
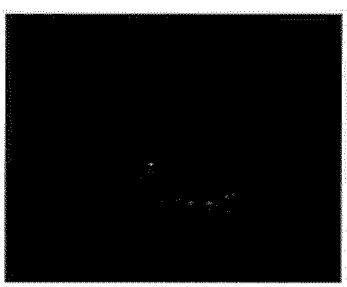
(D)
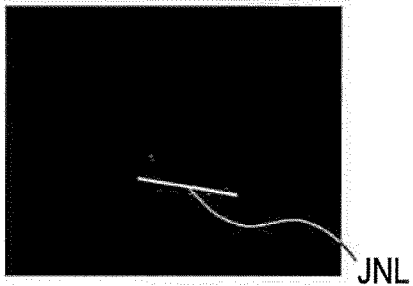
(E)

FIG. 7
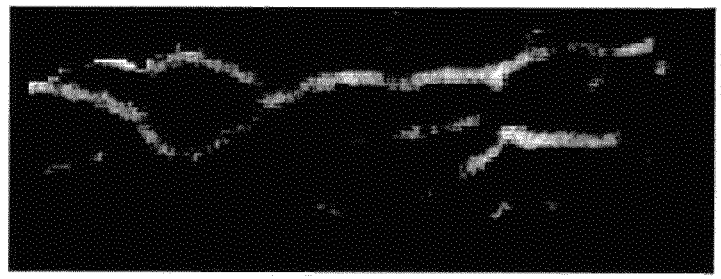
(B)
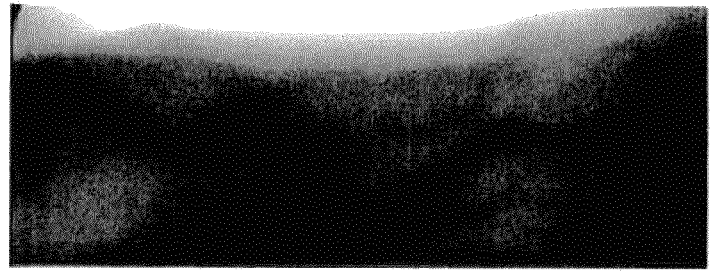
(A)

(A)  (B)

INFORMATION EXTRACTION METHOD, INFORMATION EXTRACTION DEVICE, PROGRAM, REGISTRATION DEVICE, AND VERIFICATION DEVICE

TECHNICAL FIELD

The present invention relates to an information extraction method, an information extraction device, a program, a registration device, and a verification device, which are suitable to be applied to, for example, biometrics authentication.

BACKGROUND ART

Biometrics authentication refers to methods for identifying a person using an identification target of the living body of the person. Blood vessels of a finger are one identification target of a living body.

For example, an authentication device that generates a three-dimensional image by combining images of different sides of a fingertip and that uses this as an identification target has been proposed (for example, see Patent Document 1).

Patent Document 1: Japanese Unexamined Patent Application Publication No. 2002-175529

In the authentication device, because a three-dimensional image having an amount of information that is significantly larger than the amount of information which a two-dimensional image has is used as an identification target, there is an advantage that accuracy of identification of a specified person (a person), i.e., authentication accuracy, is improved.

On the other hand, in the authentication device, there are problems that the amount of occupied memory for storing a three-dimensional image as a registration target increases, and that the load in a verification process increases. Solving these problem is particularly important in a case an authentication method is applied to mobile terminal apparatuses such as PDAs (Personal Digital Assistants) or mobile phones.

DISCLOSURE OF INVENTION

The present invention is made in view of the above-mentioned points, and is made to propose an information extraction method, an information extraction device, a program, a registration device, and a verification device that are capable of improving authentication accuracy simultaneously with reduction of the amount of information concerning an identification target.

In order to solve the above-mentioned issues, the present invention resides in an information extraction method. The information extraction method includes a first step of generating, from a plurality of first images obtained from viewpoints in surroundings of a living body portion, common portions of silhouettes of the living body portion that is shown in the images as a first stereoscopic image in a target space, and of generating, from a plurality of second images obtained from the viewpoints in the surroundings of the living body portion, common portions of silhouettes of an inner surface image of the living body portion that is shown in the images as a second stereoscopic image in the target space; and a second step of extracting, as an identification information item, a value representing a shape of a cross section of the second stereoscopic image that has a predetermined positional relationship with respect to a reference position of the first stereoscopic image.

Furthermore, the present invention resides in an information extraction device including a work memory, and an image processing unit that performs image processing with the work memory. The image processing unit performs generation of, from a plurality of first images obtained from viewpoints in surroundings of a living body portion, common portions of silhouettes of the living body portion that is shown in the images as a first stereoscopic image in a target space, and generation of, from a plurality of second images obtained from the viewpoints in the surroundings of the living body portion, common portions of silhouettes of an inner surface image of the living body portion that is shown in the images as a second stereoscopic image in the target space, and extraction of, as an identification information item, a value representing a shape of a cross section of the second stereoscopic image that has a predetermined positional relationship with respect to a reference position of the first stereoscopic image.

Moreover, the present invention resides in a program. The program causes a control unit that controls a work memory to perform generation of, from a plurality of first images obtained from viewpoints in surroundings of a living body portion, common portions of silhouettes of the living body portion that is shown in the images as a first stereoscopic image in a target space, and generation of, from a plurality of second images obtained from the viewpoints in the surroundings of the living body portion, common portions of silhouettes of an inner surface image of the living body portion that is shown in the images as a second stereoscopic image in the target space, and extraction of, as an identification information item, a value representing a shape of a cross section of the second stereoscopic image that has a predetermined positional relationship with respect to a reference position of the first stereoscopic image.

Additionally, the present invention resides in a registration device. The registration device includes generating means for generating, from a plurality of first images obtained from viewpoints in surroundings of a living body portion, common portions of silhouettes of the living body portion that is shown in the images as a first stereoscopic image in a target space, and for generating, from a plurality of second images obtained from the viewpoints in the surroundings of the living body portion, common portions of silhouettes of an inner surface image of the living body portion that is shown in the images as a second stereoscopic image in the target space; extracting means for extracting, as an identification information item, a value representing a shape of a cross section of the second stereoscopic image that has a predetermined positional relationship with respect to a reference position of the first stereoscopic image; and registration means for registering the value as an identification information item in a storage medium.

In addition, the present invention resides in a verification device. The verification device includes generating means for generating, from a plurality of first images obtained from viewpoints in surroundings of a living body portion, common portions of silhouettes of the living body portion that is shown in the images as a first stereoscopic image in a target space, and for generating, from a plurality of second images obtained from the viewpoints in the surroundings of the living body portion, common portions of silhouettes of an inner surface image of the living body portion that is shown in the images as a second stereoscopic image in the target space; extracting means for extracting, as an identification information item, a value representing a shape of a cross section of the second stereoscopic image that has a predetermined positional relationship with respect to a reference position of the first stereoscopic image; and verification means for verifying the value against a value that is registered in a storage medium as an identification information item.

According to the present invention, the identification data items are extracted as items representing shapes of portions having fixed relationships with respect to the first stereoscopic image simultaneously with representation of a shape of one portion of the second stereoscopic image. Thus, both the first stereoscopic image and the second stereoscopic image can be discretely expressed using a shape value of the one position of the second stereoscopic image. As a result, the information extraction method, the information extraction device, the program, the registration device, and the verification device that can improve authentication accuracy simultaneously with reduction of the amount of information concerning an identification target can be realized, compared with a case in which the first stereoscopic image and the second stereoscopic image are simply considered as identification data items.

BRIEF DESCRIPTION OF DRAWINGS

FIG. 5 includes schematic diagrams for explaining detection of a finger joint.

FIG. 7 includes schematic diagrams illustrating blood vessel images before and after embossing is performed.

BEST MODES FOR CARRYING OUT THE INVENTION

Figure 1:
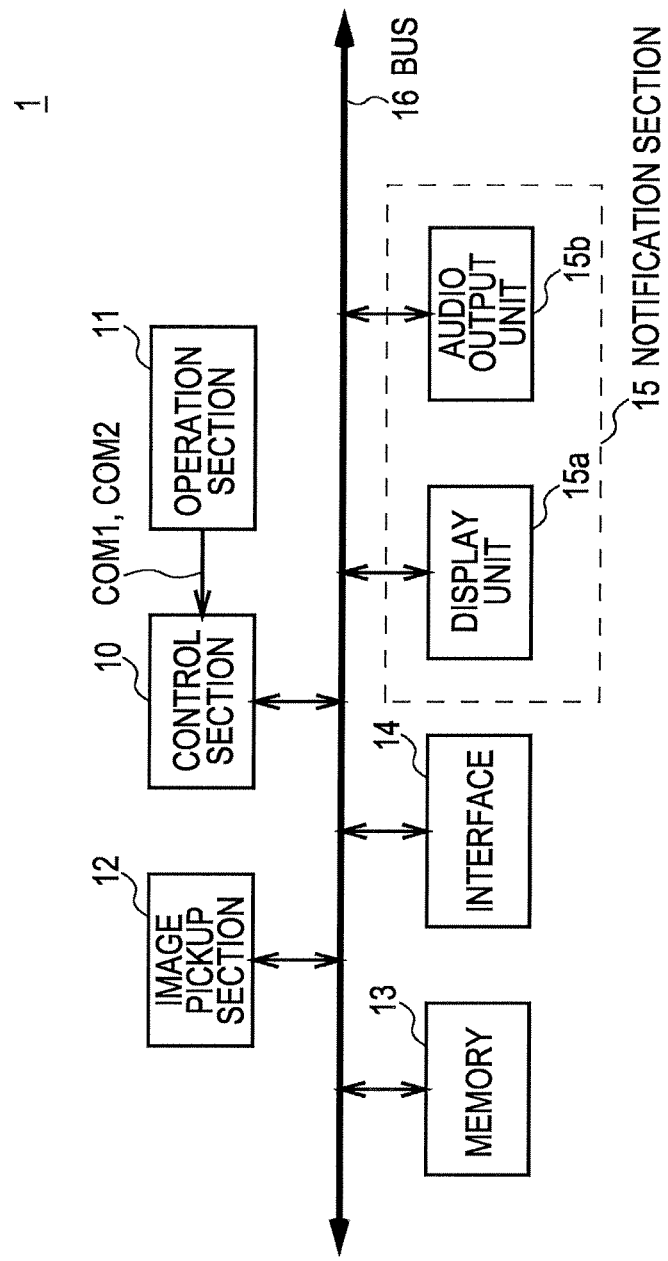
FIG. 1 is a block diagram illustrating a configuration of an authentication device according to a present embodiment.

Hereinafter, an embodiment to which the present invention is applied will be described with reference to the drawings.
(1) Overall Configuration of Authentication Apparatus According to Present Embodiment In FIG. 1, an overall configuration of an authentication device 1 according to a present embodiment is illustrated. The authentication device 1 is configured by connecting each of an operation section 11, an image pickup section 12, a memory 13, an interface 14, and a notification section 15 to a control section 10 via a bus 16.

The control section 10 is configured as a computer including a CPU (Central Processing Unit) that exercises overall control of the authentication device 1, a ROM (Read Only Memory) in which various programs, setting information, and so forth are stored, and a RAM (Random Access Memory) serving as a work memory for the CPU.

To the control section 10, an execution command COM1 for a mode in which blood vessels of a user that is a registration target (hereinafter, this will be referred to as a registrant) are to be registered (hereinafter, this will be referred to as a blood vessel registration mode) or an execution command COM2 for a mode in which whether a person is identified as a registrant (hereinafter, this will be referred to as an authentication mode) is input from the operation section 11 in accordance with a user operation.

The control section 10 is configured to determine, in accordance with the above-mentioned execution command COM1 or COM2, a mode to be executed, and configured to, in accordance with a program corresponding to a determination result, appropriately control the image pickup section 12, the memory 13, the interface 14, and the notification section 15, thereby executing the blood vessel registration mode or the authentication mode.

The image pickup section 12 adjusts the position of a lens in an optical system, the aperture value of an aperture, and the shutter speed (exposure time) of an image pickup element in accordance with an exposure value (EV) that is specified by the control section 10.

Furthermore, the image pickup section 12 picks up images of a photographic subject that are projected onto an image pickup face of the image pickup element at predetermined intervals, and sequentially outputs data items concerning the images that are generated as image pickup results (hereinafter, these will be referred to as image data items) to the control section 10.

Additionally, the image pickup section 12 drives a near-infrared light source in a period that is specified by the control section 10, and irradiates a space that is an image pickup target (hereinafter, this will be referred to as an image pickup space) with near-infrared light that is specifically absorbed in blood vessels.

When a finger is placed in the image pickup space in the period in which near-infrared light is emitted, the near-infrared light that passes inside the finger enters the image pickup element via the optical system and the aperture as light with which an image of blood vessels is projected. The image of the blood vessels inside the finder is projected onto the image pickup face of the image pickup element. Accordingly, in this case, the blood vessels are shown in an image based on an image data item that is generated as an image pickup result by the image pickup section 12.

The memory 13 is configured using, for example, a flash memory, and configured so that data which is specified by the control section 10 is stored in the memory 13 or read from the memory 13.

The interface 14 is configured to transmit/receive various data items to/from an external device connected thereto via a predetermined transmission line.

The notification section 15 includes a display unit 15a and an audio output unit 15b. The display unit 15a displays, on a display screen, characters and graphics based on display data that is supplied from the control section 10. On the other hand, the audio output unit 15b is configured to output, from a speaker, audio based on audio data that is supplied from the control section 10.

(2) Blood Vessel Registration Mode

Next, the blood vessel registration mode will be explained. When the control section 10 determines the blood vessel registration mode as a mode to be executed, the control section 10 changes an operation mode to the blood vessel registration mode, and causes the notification section 15 to issue a notification that it is necessary to place a finger in the image pickup space and to rotate the finger along a finger circumferential face (faces of a finger pulp, finger sides, and a finger dorsum).

In this case, the control section 10 causes the image pickup section 12 to perform an image pickup operation. In addition, the control section 10 causes the near-infrared light source in the image pickup section 12 to blink only in predetermined blink periods that are provided every other predetermined interval, thereby causing the near-infrared light source to perform a blink operation.

Figure 2:
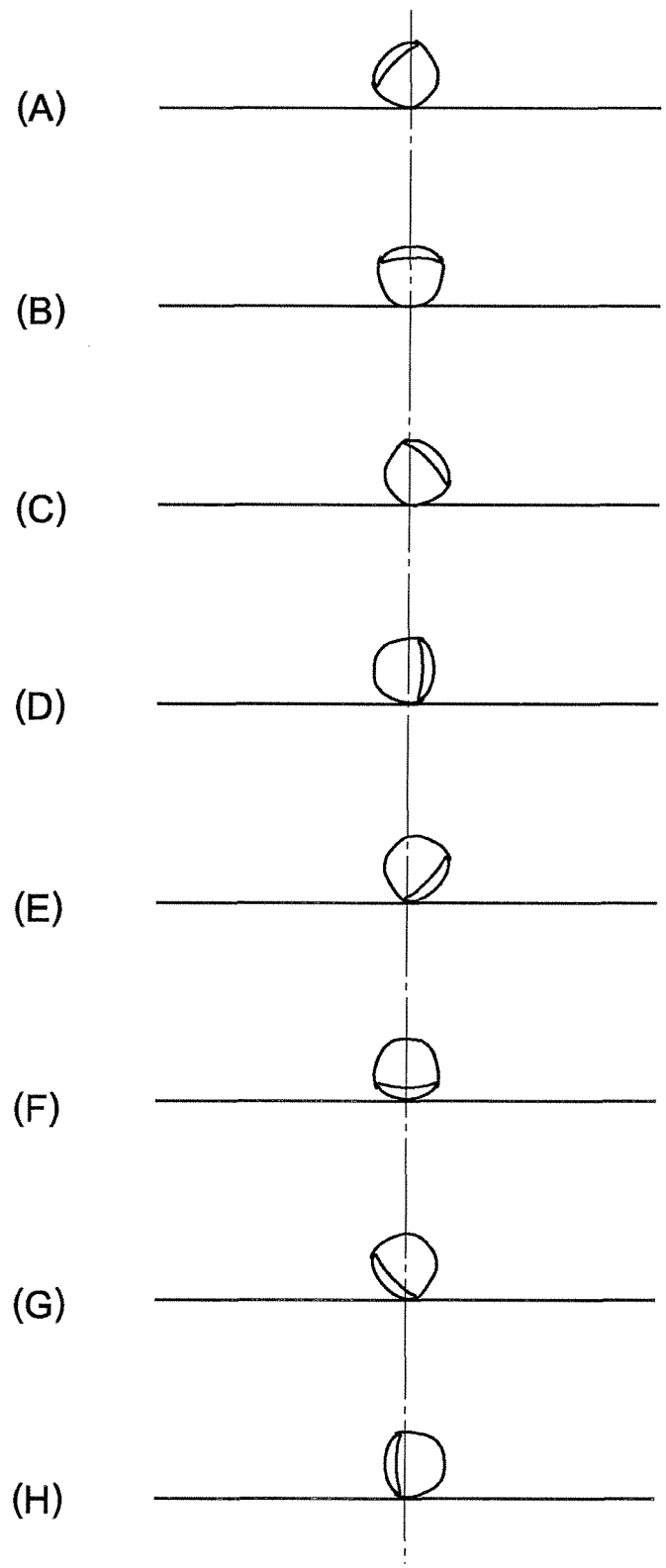
FIG. 2 includes schematic diagrams illustrating transitions of a state of a finger being rotated.
Figure 3:
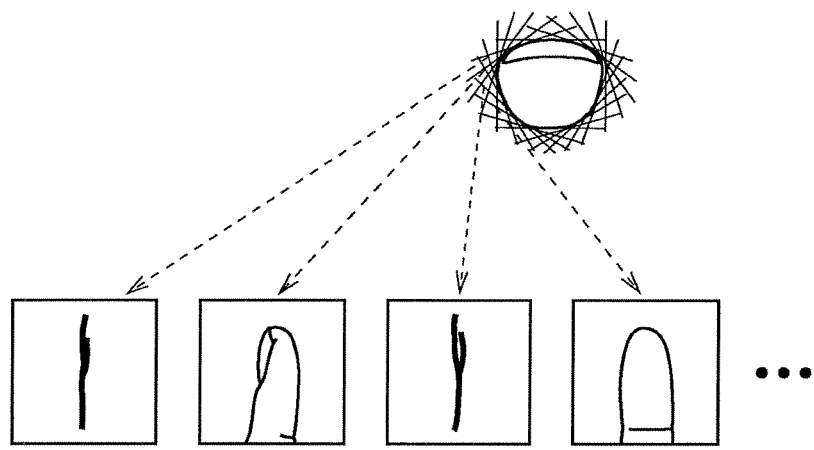
FIG. 3 includes schematic diagrams illustrating relationships between an image pickup target and images.

In this state, when a finger placed in the image pickup space is rotated along a finger circumferential face, for example, as illustrated in FIG. 2, an image of a surface of the finger (hereinafter, this will be referred to as a finger image) and an image of the blood vessels inside the finger (hereinafter, this will be referred to as a blood vessel image) are alternately obtained in accordance with the blink operation of the near-infrared light source in the image pickup section 12, for example, as illustrated in FIG. 3. Note that the finger image is picked up using visible light as image pickup light, and that the blood vessel image is picked up using near-infrared light as the image pickup light.

Furthermore, the control section 10 generates a stereoscopic image of the finger (hereinafter, this will be referred to as a finger stereoscopic image) and a stereoscopic image of the blood vessels (hereinafter, this will be referred to as a blood vessel stereoscopic image) from image data items that are input from the image pickup section 12 in an image pickup order, and extracts values representing shapes of cross sections of the stereoscopic images (hereinafter, these will be referred to as cross-section shape values). Then, the control section 10 stores the cross-section shape values as data items concerning an identification target (hereinafter, these will be referred to as identification data items) in the memory 13, thereby registering the blood vessels.

In this manner, the control section 10 is configured to be capable of executing the blood vessel registration mode.

(3) Authentication Mode

Next, the authentication mode will be explained. When the control section 10 determines the authentication mode as a mode to be executed, the control section 10 changes the operation mode to the authentication mode, and causes, as in the case of the blood vessel registration mode, the notification section 15 to issue a notification that it is necessary to rotate a finger along a finger circumferential face in the image pickup space. And, the control section 10 causes the image pickup section 12 to perform the image pickup operation, and causes the near-infrared light source to perform the blink operation.

Furthermore, the control section 10 extracts cross-section shape values of a finger stereoscopic image and a blood vessel stereoscopic image from image data items that are input from the image pickup section 12 in an image pickup order as in the case of the blood vessel registration mode. Then, the control section 10 is configured to verify the extracted cross-section shape values against cross-section shape values that are stored as identification data items in the memory 13, and configured to determine using a verification result whether or not the finger's owner can be approved as a registrant.

Here, when it is determined that the finger's owner cannot be approved as a registrant, the control section 10 provides a visual and aural notification indicating the disapproval via the display unit 15a and the audio output unit 15b. In contrast, when it is determined that the finger's owner can be approved as a registrant, the control section 10 sends data indicating that the finger's owner has been approved as a registrant to a device that is connected to the interface 14. In this device, a predetermined process, such as closing a door for a fixed period or cancelling the operation mode that is a limitation target, that should be performed when authentication is successful is performed using, as a trigger, the data indicating that the finger's owner has been approved as a registrant.

In this manner, the control section 10 is configured to be capable of executing the authentication mode.

(4) Extraction Process of Cross-section Shape Values

Figure 4:
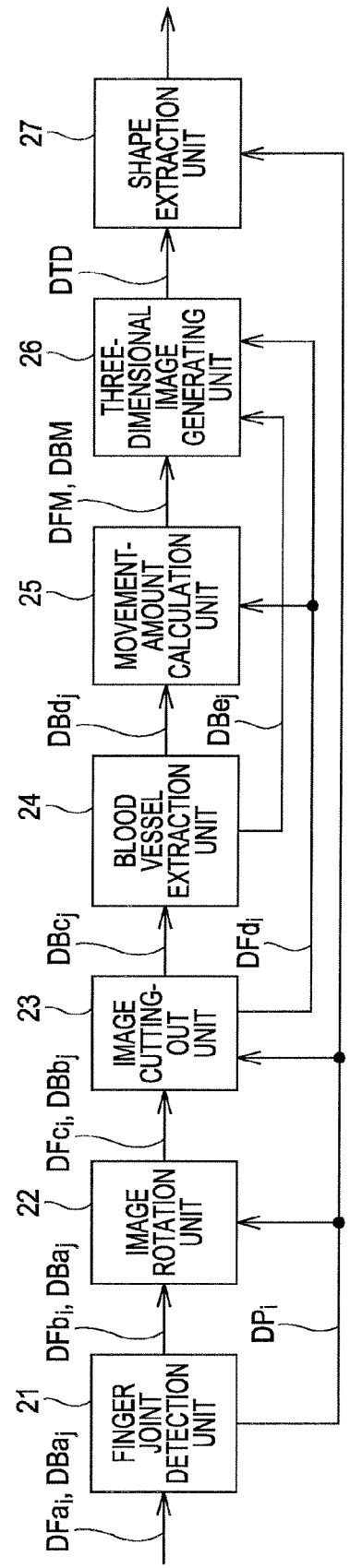
FIG. 4 is a block diagram illustrating a functional configuration of a control section.

Next, a process of extracting cross-section shape values that is performed by the control section 10 will be explained. In terms of functions, as illustrated in FIG. 4, this process can be divided into a finger joint detection unit 21, an image rotation unit 22, an image cutting-out unit 23, a blood vessel extraction unit 24, a movement-amount calculation unit 25, a three-dimensional image generating unit 26, and a shape extraction unit 27. Hereinafter, the finger joint detection unit 21, the image rotation unit 22, the image cutting-out unit 23, the blood vessel extraction unit 24, the movement-amount calculation unit 25, the three-dimensional image generating unit 26, and the shape extraction unit 27 will be explained in detail.

(4-1) Detection of Finger Joint

An image data item $DFa_i$ (i=1, 3, 5, ..., or n (n is an odd number)) concerning a finger image (hereafter, this will be referred to as a finger image data item) or an image data item $DBa_j$ (j=2, 4, 6, ..., or (n−1)) concerning a blood vessel image (hereafter, this will be referred to as a blood vessel image data item), which have been subjected to a process of appropriately decimating image data items so that a finger image and a blood vessel image are alternately obtained on a frame-by-frame basis, is input from the image pickup section 12 to the finger joint detection unit 21.

When the finger joint detection unit 21 obtains the blood vessel image data item $DBa_j$, the finger joint detection unit 21 supplies the blood vessel image data item $DBa_j$ to the image rotation unit 22.

On the other hand, when the finger joint detection unit 21 obtains the finger image data item $DFa_i$, the finger joint detection unit 21 detects a joint from a finger image based on the finger image data item $DFa_i$. Furthermore, when the finger joint detection unit 21 has detected the joint, the finger joint detection unit 21 supplies a position data item $DP_i$ representing a position of the joint to the image rotation unit 22, the image cutting-out unit 23, and the shape extraction unit 27, and supplies, to the image rotation unit 22, a data item concerning the finger image from which a finger region has been extracted (a finger image data item) $DFb_i$, which has been obtained in a process of detecting the joint.

An example of a detection method that is performed by the finger joint detection unit 21 will be explained. When the finger joint detection unit 21 obtains the finger image data item $DFa_i$, the finger joint detection unit 21 extracts, for example, as illustrated in FIG. 5, on the basis of a contrast in the finger image (part (A) of FIG. 5), a finger region from the finger image (part (B) of FIG. 5).

Next, the finger joint detection unit 21 extracts points constituting finger contours (hereinafter, these will be referred to as finger contour points) from the finger region using a contour extraction filter (part (C) of FIG. 5), and extracts finger contour points in a horizontal direction from the finger contour points by extending them using Hough transform or the like (part (D) of FIG. 5).

Then, the finger joint detection unit 21 is configured to detect a line segment passing substantially through the centers of the individual extended finger contours as a joint JNL (part (E) of FIG. 5).

(4-2) Rotation Correction of Images

When the image rotation unit 22 obtains the finger image data item $DFb_i$, the image rotation unit 22 recognizes the position of the joint from the position data item $DP_i$ corresponding to the finger image data item $DFb_i$, and performs rotation correction on the finger image with respect to the position of the joint. Then, the image rotation unit 22 supplies, to the image cutting-out unit 23, a data item concerning the finger image that has been subjected to rotation correction (a finger image data item) $DFc_i$.

On the other hand, when the image rotation unit 22 obtains the blood vessel image data item $DBa_j$, the image rotation unit 22 recognizes the position of the joint from the position data item $DP_i$ corresponding to the finger image data item $DFb_i$ that was obtained immediately before the blood vessel image data item $DBa_j$, and performs rotation correction on the blood vessel image with respect to the position of the joint. Then, the image rotation unit 22 supplies, to the image cutting-out unit 23, a data item concerning the blood vessel image that has been subjected to rotation correction (a blood vessel image data item) $DBb_j$.

Figure 6:
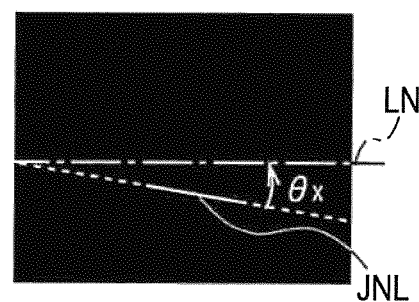
FIG. 6 is a schematic diagram for explaining calculation of a rotation correction amount.

An example of a rotation method that is performed by the image rotation unit 22 will be explained. The image rotation unit 22 obtains, as a rotation correction amount of the finger image, an angle $\theta x$ that is defined by the joint JNL with respect to a line LN in a column direction of the image, for example, as illustrated in FIG. 6. Note that, although a manner in which rotation correction is performed on the finger image is illustrated as an example in FIG. 6, rotation correction is performed on the blood vessel image in the same manner. Then, the image rotation unit 22 is configured to perform rotation correction on the image in accordance with the rotation correction amount ($\theta x$).

As a result, in this example, a finger image and a blood vessel image that were obtained from each viewpoint are subjected to rotation correction so that the longitudinal direction of the finger which is shown in each of the images will be a row direction of the image. Note that, although a case in which rotation correction is performed so that the angle defined by the column direction of the image and an extension direction of the joint JNL will be 0 [°] is described in this example, it is only necessary that an angle defined by the row or column direction of the image and the extension direction of the joint be a predetermined angle.

(4-3) Cutting-out of Images

When the image cutting-out unit 23 obtains the finger image data item $DFc_i$, the image cutting-out unit 23 recognizes the position of the joint from the position data item $DP_i$ corresponding to the finger image data item $DFb_i$, and cuts out, with respect to the position of the joint, a region having a predetermined size from the finger image. Then, the image cutting-out unit 23 supplies, to the movement-amount calculation unit 25 and the three-dimensional image generating unit 26, a data item concerning an image in the cut-out region (hereinafter, this will be referred to as a finger image partial data item) $DFd_i$.

On the other hand, when the image cutting-out unit 23 obtains the blood vessel image data item $DBb_j$, the image cutting-out unit 23 recognizes the position of the joint from the position data item $DP_i$ corresponding to the finger image data item $DFc_i$ that was obtained immediately before the blood vessel image data item $DBb_j$, and cuts out, with respect to the position of the joint, a region having a predetermined size from the blood vessel image. Then, the image cutting-out unit 23 supplies, to the blood vessel extraction unit 24, a data item concerning an image in the cut-out region (hereinafter, this will be referred to as a blood vessel image partial data item) $DBc_j$.

(4-4) Extraction of Blood Vessels

When the blood vessel extraction unit 24 obtains the blood vessel image partial data item $DBc_j$, the blood vessel extraction unit 24 embosses the blood vessels that are shown in the blood vessel image using a differential filter such as a Gaussian filter or a Log filter, and supplies, to the movement-amount calculation unit 25, a data item concerning an image in which the blood vessels are embossed (a blood vessel image partial data item) $DBd_j$.

Herein, examples of images before and after embossing is performed are illustrated in FIG. 7. In the blood vessel image before embossing is performed (part (A) of FIG. 7), boundaries between the blood vessels and the other portions are not clear. However, in the blood vessel image after embossing is performed (part (B) of FIG. 7), the boundaries become clear. Also as is clear from FIG. 7, the blood vessels are emphasized using this process, and as a result, the blood vessels and the other portions can be clearly distinguished from each other.

Furthermore, when the blood vessel extraction unit 24 has embossed the blood vessels, the blood vessel extraction unit 24 converts the image in which the blood vessels are embossed to a binary image (hereinafter, this will be referred to as a binary blood vessel image) on the basis of a brightness value that has been set, and supplies a data item concerning the binary blood vessel image (a blood vessel image partial data item) $DBe_j$ to the three-dimensional image generating unit 26.

(4-5) Calculation of Movement Amounts

When the movement-amount calculation unit 25 selects, as a process target, the finger image partial data item $DFd_i$ that is input from the image cutting-out unit 23, the movement-amount calculation unit 25 calculates a movement amount of the finger that is shown in a finger image based on the selected finger image partial data item $DFd_i$ and in a finger image based on a finger image partial data item $DFd_i$ which was input before the selected finger image partial data item $DFd_i$. Then, when the movement-amount calculation unit 25 has calculated the movement amount, the movement-amount calculation unit 25 supplies a data item representing the movement amount (hereinafter, this will be referred to as a movement amount data item) $DFM_{1-3}$, $DFM_{3-5}$, $DFM_{5-7}$, ..., or $DFM_{(n-2)-n}$ to the three-dimensional image generating unit 26.

On the other hand, when the movement-amount calculation unit 25 selects, as a process target, the blood vessel image partial data item $DBd_j$ that is input from the image cutting-out unit 23, the movement-amount calculation unit 25 calculates a movement amount of the blood vessels that are shown in a blood vessel image based on the selected blood vessel image partial data item $DBd_j$ and in a blood vessel image based on a blood vessel image partial data item $DBd_{j'}$ which was input before the selected blood vessel image partial data item $DBd_{j'}$. Then, when the movement-amount calculation unit 25 has calculated the movement amount, the movement-amount calculation unit 25 supplies a movement amount data item $DBM_{2-4}$, $DBM_{4-6}$, $DBM_{6-8}$, . . . , or $DBM_{(n-3)-(n-1)}$ to the three-dimensional image generating unit 26.

An example of a calculation method that is performed by the movement-amount calculation unit 25 will be explained. In the movement-amount calculation unit 25, a movement amount is calculated using an optical flow. Hereinafter, the finger image or blood vessel image that is selected as a process target is referred to as a current image, and the finger image or blood vessel image that was input before the above-mentioned finger image or blood vessel image is referred to as a previous image.

In other words, the movement-amount calculation unit 25 determines a point that is a focus target (hereinafter, this will be referred to as a focus point) AP in a current image IM1, for example, as illustrated in part (A) of FIG. 8, and recognizes a brightness value of an (m×n)-pixel block (hereinafter, this will be referred to as a focus block) ABL having the focus point AP as a center.

Then, as illustrated in part (B) of FIG. 8, the movement-amount calculation unit 25 searches a previous image IM2 for a block so that a difference between a brightness value of the block and the brightness value of the focus block ABL is minimized, considers the center of a searched block RBL as a point corresponding to the focus point AP (hereinafter, this will be referred to as a corresponding point) XP, and obtains a position vector $V(V_x, V_y)$ to the corresponding point XP with respect to a position AP' corresponding to the focus point AP.

In this manner, the movement-amount calculation unit 25 is configured to search the previous image IM2 for blocks corresponding to a plurality of individual focus blocks in the current image IM1. In addition, the movement-amount calculation unit 25 is configured to calculate the average of individual position vectors between the centers (XP) of the blocks and the positions (AP'), which are the same as positions of the centers of the focus blocks, (the average of vector components $V_x$ in the horizontal direction and the average of vector components $V_y$ in the vertical direction) as a movement amount.

This movement amount is a value that represents not only a movement in a horizontal direction (a rotation direction) with respect to a face on which the finger is placed, but also a movement in a vertical direction (a direction orthogonal to the rotation direction) with respect to the face, which is caused by fluctuation of a finger pressure amount or a rotation axis, or the like.

Note that a value (a representative value) that is obtained from the individual position vectors using a statistical method, such as the maximum value, the minimum value, or the standard deviation value of the individual position vectors, can be employed as the movement amount instead of the average of the individual position vectors (the average of vector components $V_x$ in the horizontal direction and the average of vector components $V_y$ in the vertical direction).

In the movement-amount calculation unit 25 in this embodiment, a blood vessel image that is obtained in an intermediate course of a blood vessel extraction process (a blood vessel image after being subjected to an embossing process and prior to being subjected to binarization (the blood vessel image partial data item $DBd_j$)) is employed as a target to calculate a movement amount in the blood vessel images.

Figure 9:
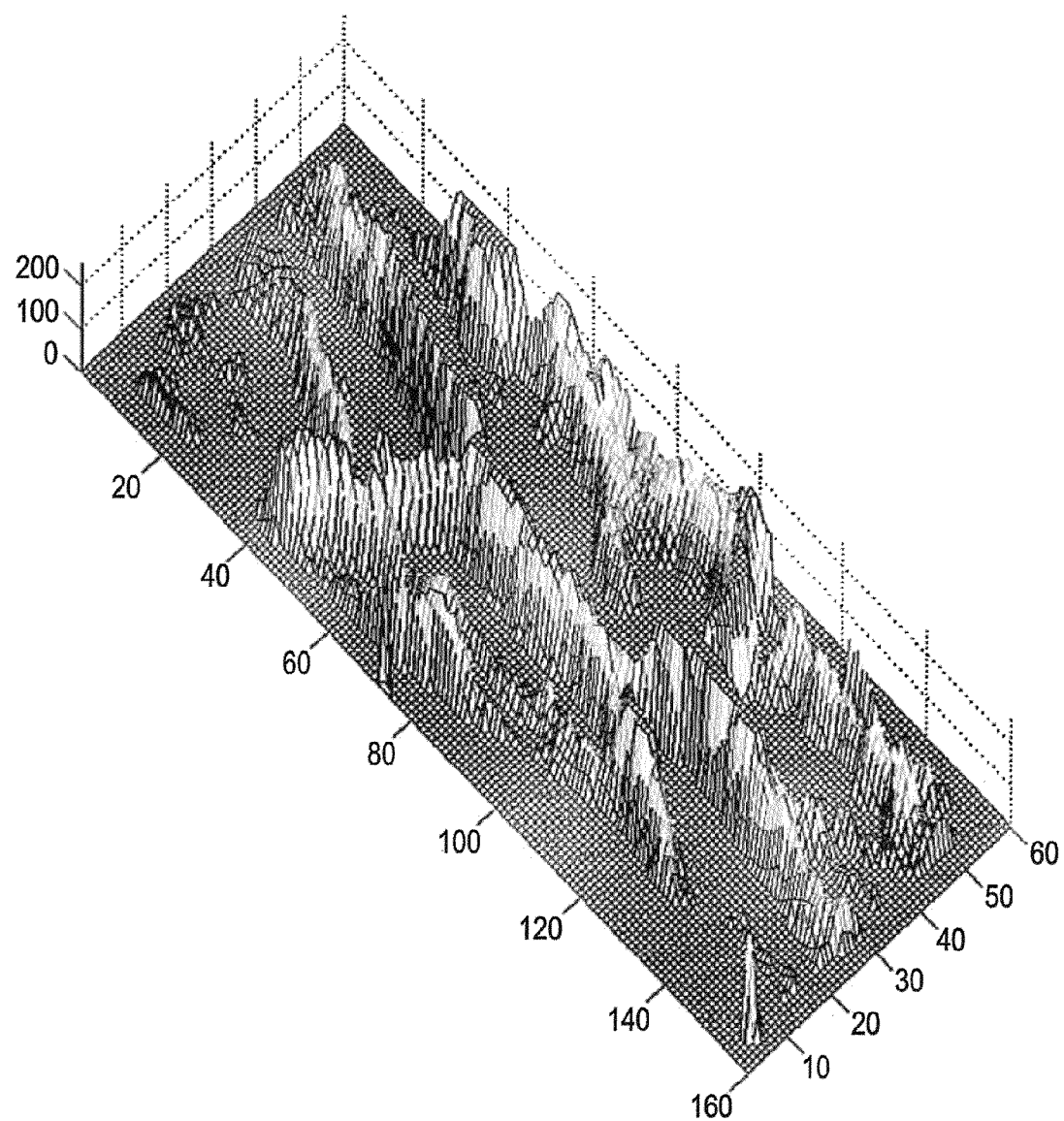
FIG. 9 is a schematic diagram illustrating a state of brightness of a blood vessel image after an embossing process is performed.
Figure 10:
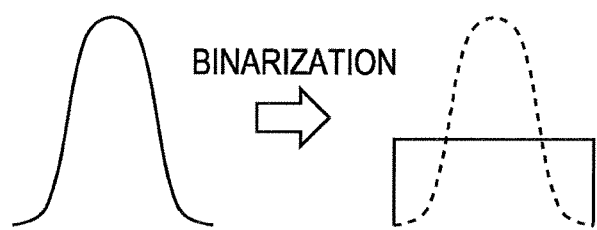
FIG. 10 includes a schematic diagram illustrating transition of a state of brightness through a blood vessel extraction process.
Figure 11:
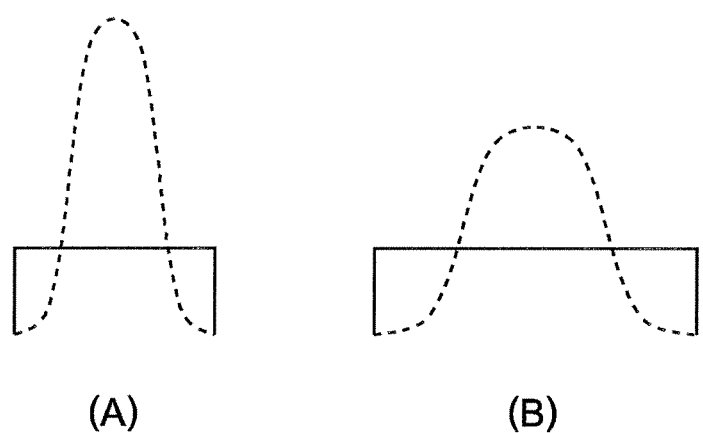
FIG. 11 includes schematic diagrams for explaining equalization of states of brightness.

In the blood vessel image prior to being subjected to the blood vessel extraction process (the blood vessel image prior to being subjected to the embossing process), the blood vessels and the other portions are clearly distinguished from each other as described above with reference to FIG. 7, and the brightness of the blood vessels in the blood vessel image is considered as information indicating a state of an actual cross section as illustrated in FIG. 9. However, this information has been discarded in a case of the blood vessel image after being subjected to the blood vessel extraction process (the binary blood vessel image) as illustrated in FIG. 10. Accordingly, for example, as illustrated in part (A) of FIG. 11 and part (B) of FIG. 11, even when images show cross sections of blood vessels that are different from each other, a probability that the images of the cross sections have the same brightness after the images are subjected to the extraction process increases.

Figure 8:
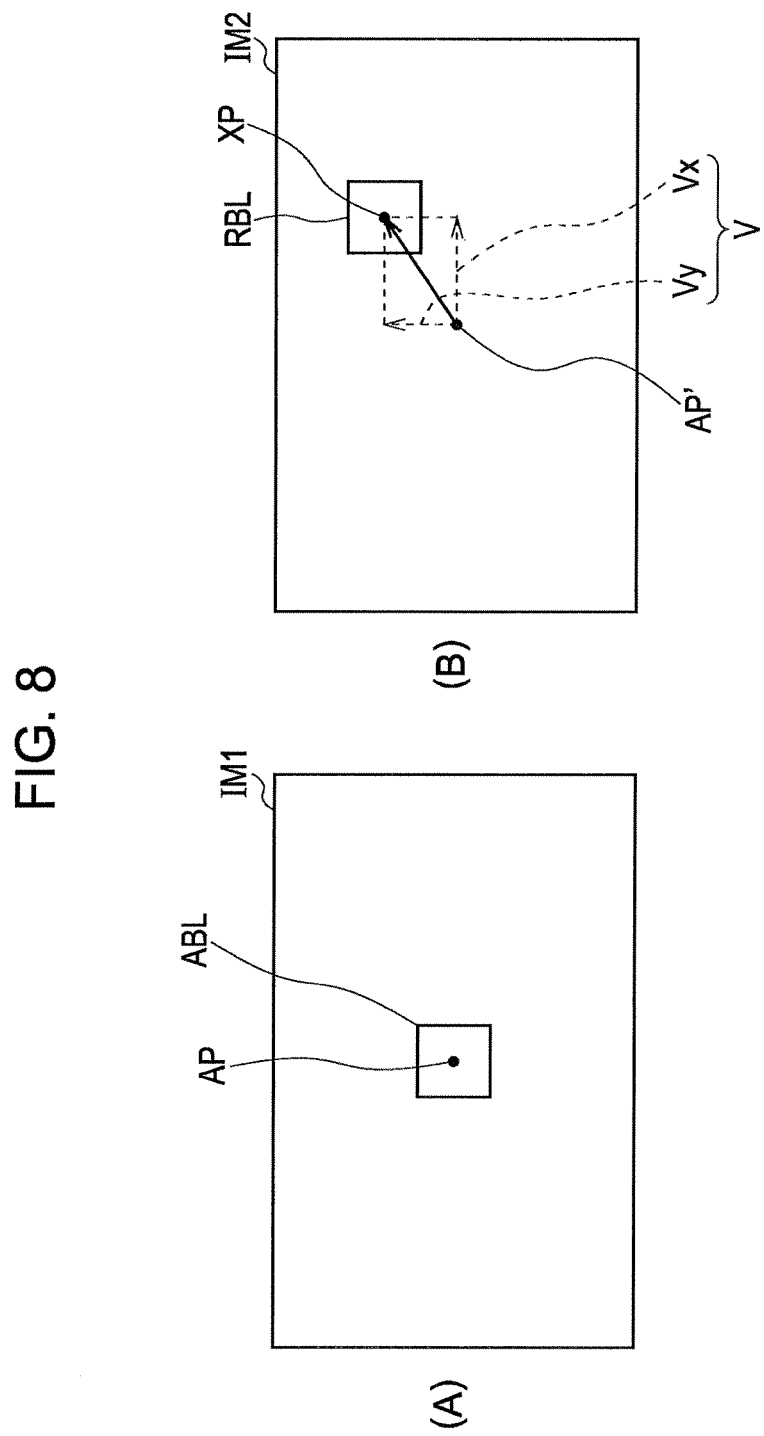
FIG. 8 includes schematic diagrams for explaining calculation of a movement amount.

Accordingly, if the image after being subjected to the blood vessel extraction process (the binary blood vessel image) is employed as an image that is a target to calculate a movement amount, in a case in which the previous image IM2 is searched for a block so that a difference between a brightness value of the block and the brightness value of the focus block ABL in the present image IM1 is minimized (part (B) of FIG. 8), a large number of blocks having a brightness value that is equal to or substantially equal to the brightness value of the focus block ABL appear. Thus, the block RBL actually corresponding to the focus block ABL cannot be searched, and as a result, this leads to a situation in which accuracy of calculation of a movement amount is reduced.

For this reason, in the movement-amount calculation unit 25, the blood vessel image that is obtained in the intermediate course of the blood vessel extraction process (the blood vessel image after being subjected to the embossing process and prior to being subjected to binarization (the blood vessel image partial data item $DBd_j$)) is employed as a target to calculate a movement amount in the blood vessel images.

Note that, although, typically, the plurality of focus blocks in the current image IM1 correspond to all pixels of the current image IM1, the plurality of focus blocks in the current image IM1 may correspond to some of portions constituting the finger or blood vessels shown in the current image IM1.

Furthermore, typically, the entire previous image IM2 is considered as a range of the previous image IM2 in which a block is searched so that a difference between a brightness value of the block and the brightness value of the focus block ABL is minimized. However, this range may be a range whose center is placed at a position that is shifted by a movement amount detected in the past and the size of which corresponds to the size of the plurality of focus blocks. The shape of this range may be changed in accordance with a temporal change amount of the movement amount that was detected in the past.

(4-6) Generation of Three-dimensional Images

Figure 12:
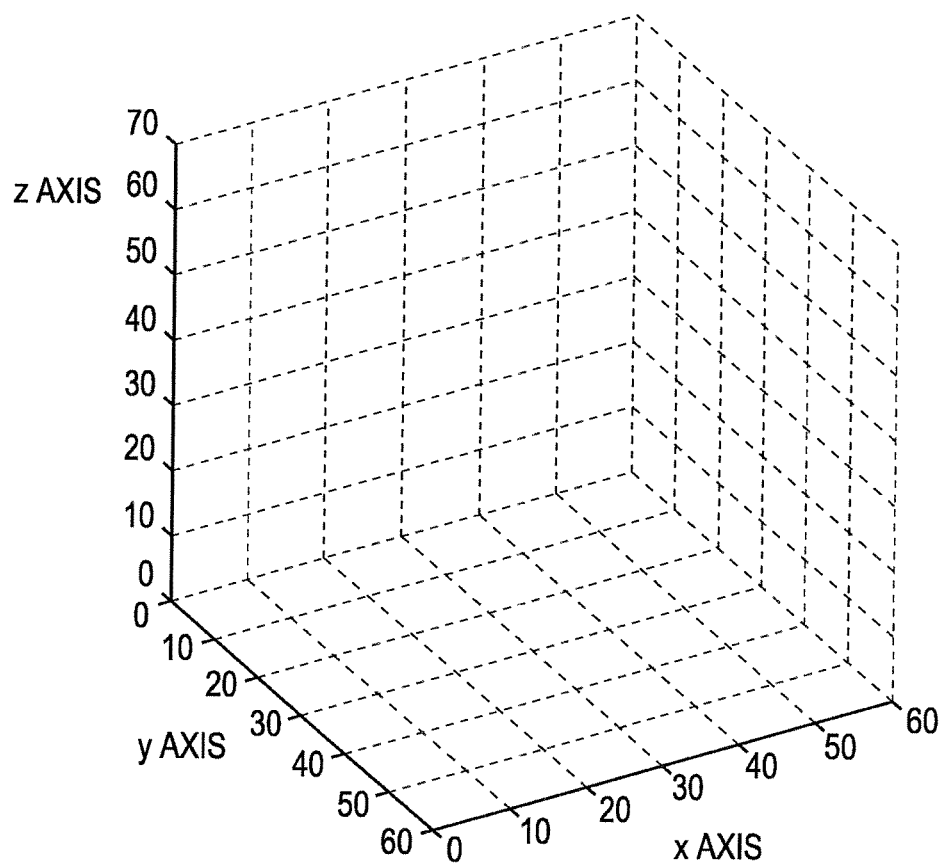
FIG. 12 is a schematic diagram illustrating a voxel space.

As illustrated in FIG. 12, the three-dimensional image generating unit 26 defines a three-dimensional space having a predetermined shape in which a cube that is called a voxel is used as a constitution unit (hereinafter, this will be referred to as a voxel space) as a space that is a projection target.

And, the three-dimensional image generating unit 26 generates, on the basis of the finger image partial data items DFd$_1$, DFd$_3$, DFd$_{(n-2)}$, and DFd$_n$ that are input from the image cutting-out unit 23, common portions of silhouettes of the finger that is shown in the finger images as a finger stereoscopic image (a three-dimensional volume) in the voxel space.

On the other hand, the three-dimensional image generating unit 26 generates, on the basis of the blood vessel image partial data items DBe$_2$, DBe$_4$, . . . , DBe$_{(n-3)}$, and DBe$_{(n-1)}$ that are input from the blood vessel extraction unit 24, common portions of silhouettes of the blood vessels that are shown in the blood vessel images as a blood vessel stereoscopic image (a three-dimensional volume) in the voxel space.

Furthermore, when the three-dimensional image generating unit 26 has generated the finger stereoscopic image and the blood vessel stereoscopic image in the defined voxel space, the three-dimensional image generating unit 26 supplies a data item (a voxel data item) concerning these stereoscopic images as a three-dimensional volume data item DTD to the surface shape extraction unit 27.

An example of a method for generating a finger stereoscopic image that is performed by the three-dimensional image generating unit 26 will be explained. The three-dimensional image generating unit 26 recognizes, in accordance with camera information such as a focal distance and an image center and in accordance with information concerning the voxel space, viewpoints in surroundings of the finger from which the individual finger images were picked up. When projection into the voxel space from the individual viewpoints is performed for the finger that is shown in the images, the three-dimensional image generating unit 26 detects individual silhouette regions that are projected into the voxel space.

Figure 13:
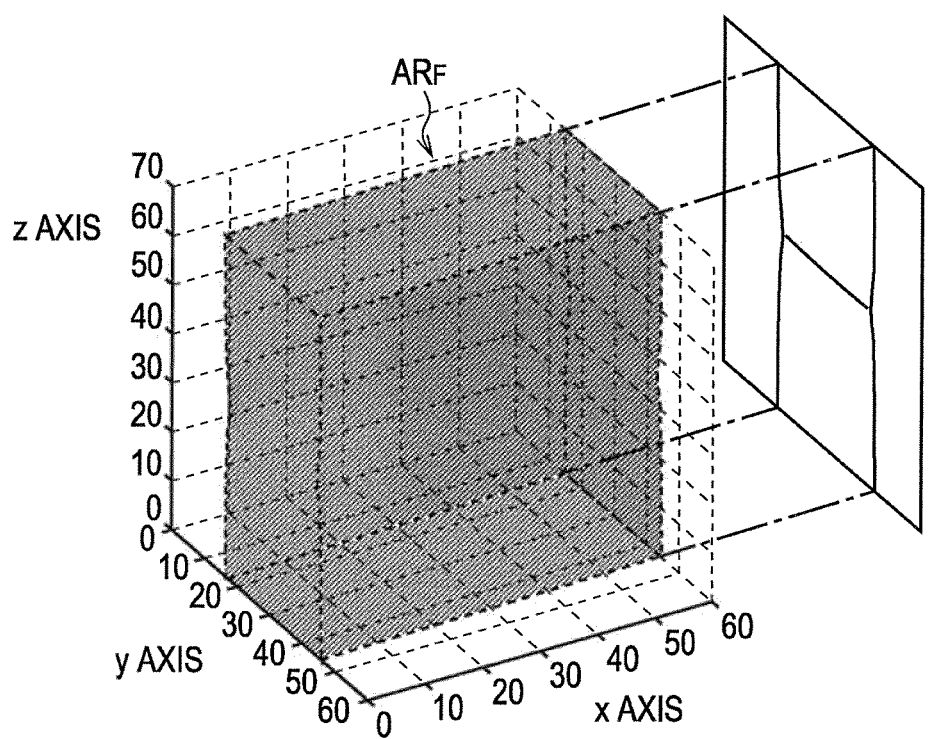
FIG. 13 is a schematic diagram for explaining detection of a silhouette region of a finger.

In other words, when the finger image partial data item DFd$_1$ that is first input from the image cutting-out unit 23 is considered as a process target, the three-dimensional image generating unit 26 places a finger image based on the finger image partial data item DFd$_1$ as a reference image at a position corresponding to a viewpoint at which a rotation angle is 0 [°] among the viewpoints in the surroundings of the voxel space, for example, as illustrated in FIG. 13, and detects a silhouette region AR$_F$ that is projected in a range from a projection surface of the voxel space to an innermost portion of the voxel space.

Specifically, the individual voxels of the voxel space are reversely projected onto a finger image, and projection points are calculated. The voxels whose projection points exist within a contour of the finger shown in the finger image are left as voxels of a silhouette region, thereby detecting the silhouette region.

On the other hand, when the finger image partial data item DFd$_3$, DFd$_5$, . . . that is input from the image cutting-out unit 23 after the first finger image partial data item DFd$_1$ is input is considered as a process target, the three-dimensional image generating unit 26 recognizes a movement amount in a rotation direction from the reference image to a finger image based on the finger image partial data item DFd, which is considered as the process target, (hereinafter, this will be referred to as a rotation movement amount) on the basis of the corresponding movement amount data item DFM that is input from the movement-amount calculation unit 25.

Then, when the rotation movement amount is denoted by V$_{x1}$ and a value that is set as a distance from the rotation axis of the finger to a surface of the finger is denoted by r1, the following equation is obtained.

$$\theta_{ro1} = \arctan(V_{x1}/r1) \tag{1}$$

Using the equation, the three-dimensional image generating unit 26 obtains a rotation angle of the finger image that is the current process target with respect to the reference image (hereinafter, this will be referred to as a first rotation angle) $\theta_{ro1}$, and determines whether or not the first rotation angle $\theta_{ro1}$ is smaller than 360 [°].

When the first rotation angle $\theta_{ro1}$ is smaller than 360 [°], this indicates a state in which all of view volumes (silhouette regions) for the plurality of finger images that were picked up in the entire surroundings of the finger have not been detected yet. In this case, the three-dimensional image generating unit 26 obtains a difference between the first rotation angle $\theta_{ro1}$ and a rotation angle of a finger image, for which a view volume was detected immediately before for the current process target, with respect to the reference image (hereinafter, this will be referred to as a second rotation angle), and determines whether or not the difference is equal to or larger than a predetermined threshold.

When the difference is smaller than the threshold, this indicates a state in which rotation of the finger is stopped or almost stopped. In this case, the three-dimensional image generating unit 26 does not obtain a silhouette region of the finger image that is the current process target, and considers, as a process target, the finger image partial data item DFd that is to be input so as to follow the current process target. In this manner, the three-dimensional image generating unit 26 is configured to be capable of preventing calculation of a useless silhouette region in advance.

Figure 14:
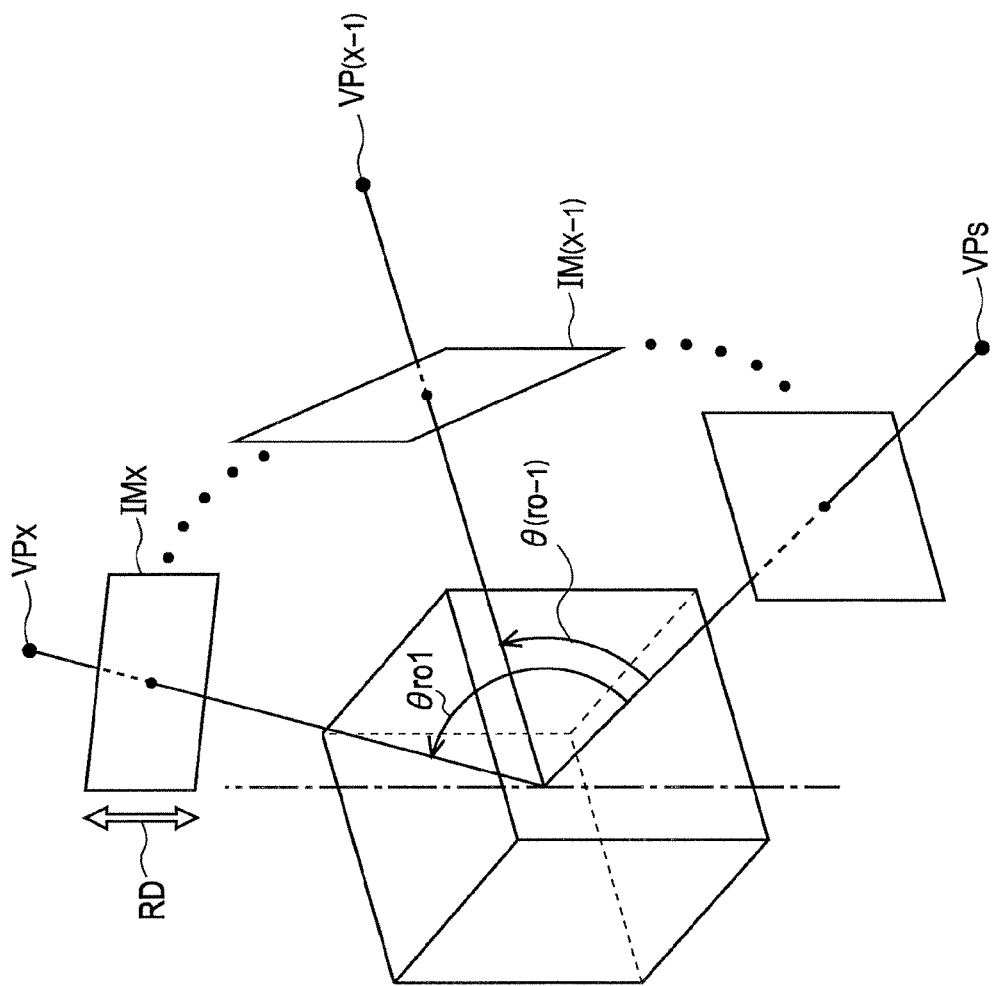
FIG. 14 is a schematic diagram for explaining positional relationships among individual images that are placed in surroundings of the voxel space.

In contrast, when the difference is equal to or larger than the threshold, this indicates a state in which the finger is currently being rotated. In this case, the three-dimensional image generating unit 26 recognizes a viewpoint VP$_X$ that defines the first rotation angle $\theta_{ro1}$ with respect to a viewpoint VP$_S$ for a reference position IM$_S$, for example, as illustrated in FIG. 14, and places a finger image IM$_X$ that is the current process target at a position corresponding to the viewpoint VP$_X$.

And, the three-dimensional image generating unit 26 is configured to detect a silhouette region which is projected for the finger image IM$_X$ in a range from a projection surface of the projection space to an innermost of the projection space, and, then, configured to consider, as a process target, the finger image partial data item DFd that is to be input so as to follow the current process target.

Note that, when the three-dimensional image generating unit 26 places the finger image IM$_X$ that is the current process target in the surroundings of the voxel space, the three-dimensional image generating unit 26 recognizes, for the finger image IM$_X$ and for a finger image IM$_{(X-1)}$ for which a view volume was detected immediately before for the finger image IM$_X$, a movement amount in a direction orthogonal to the rotation direction of the finger (the average of vector components V$_y$ in the vertical direction in the finger image that is the current process target and in the finger image that was last placed) on the basis of the corresponding movement amount data item DFM (FIG. 4), and performs position correction on the viewpoint VP$_X$ by only the movement amount in a correction direction (a direction parallel to the z-axis direction of the voxel space) RD.

Accordingly, even in a case in which fluctuation of the finger pressure amount or the rotation axis, or the like occurs when the finger is rotated, the three-dimensional image generating unit 26 can detect a silhouette region in accordance with the fluctuation. Thus, the three-dimensional image generating unit 26 is configured to be capable of accurately detecting a silhouette region, compared with a case in which the movement amount in the direction orthogonal to the rotation direction of the finger is not considered.

In this manner, the three-dimensional image generating unit 26 detects individual silhouette regions of the finger that is shown in the individual finger images which were picked up in the surroundings of the finger until the first rotation angle $\theta_{ro1}$ with respect to the reference image becomes 360 [°] or larger.

Figure 15:
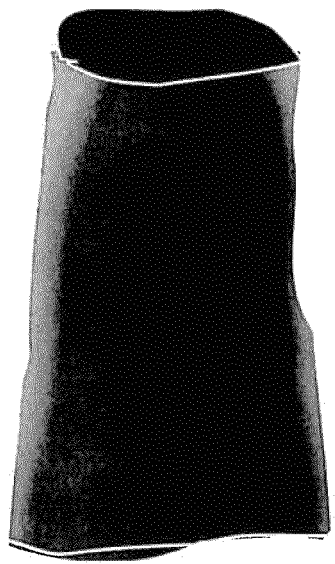
FIG. 15 is a schematic diagram illustrating a finger stereoscopic image.

Furthermore, when the first rotation angle $\theta_{ro1}$ with respect to the reference image becomes 360 [°] or larger, the three-dimensional image generating unit 26 is configured to extract, as a finger stereoscopic image (a three-dimensional volume), common portions of the individual silhouette regions that have been detected so far, thereby generating the finger stereoscopic image, for example, as illustrated in FIG. 15.

Next, an example of a method for generating a blood vessel stereoscopic image that is performed by the three-dimensional image generating unit 26 will be explained. As in the case of the finger stereoscopic image, the three-dimensional image generating unit 26 recognizes, in accordance with the camera information and the information concerning the voxel space, the viewpoints in the surroundings of the finger from which the individual blood vessel images were picked up. When projection into the projection space from the individual viewpoints is performed for the blood vessels that are shown in the images, the three-dimensional image generating unit 26 detects individual silhouette regions that are projected into the projection space.

However, the three-dimensional image generating unit 26 does not detect a silhouette region that is projected in a range from a projection surface of the projection space to an innermost of the projection space. The three-dimensional image generating unit 26 detects a silhouette region of the blood vessels that is projected in a range from the projection surface of the projection space to a projection face that is a defined length distant in a direction toward the innermost of the projection space.

Figure 16:
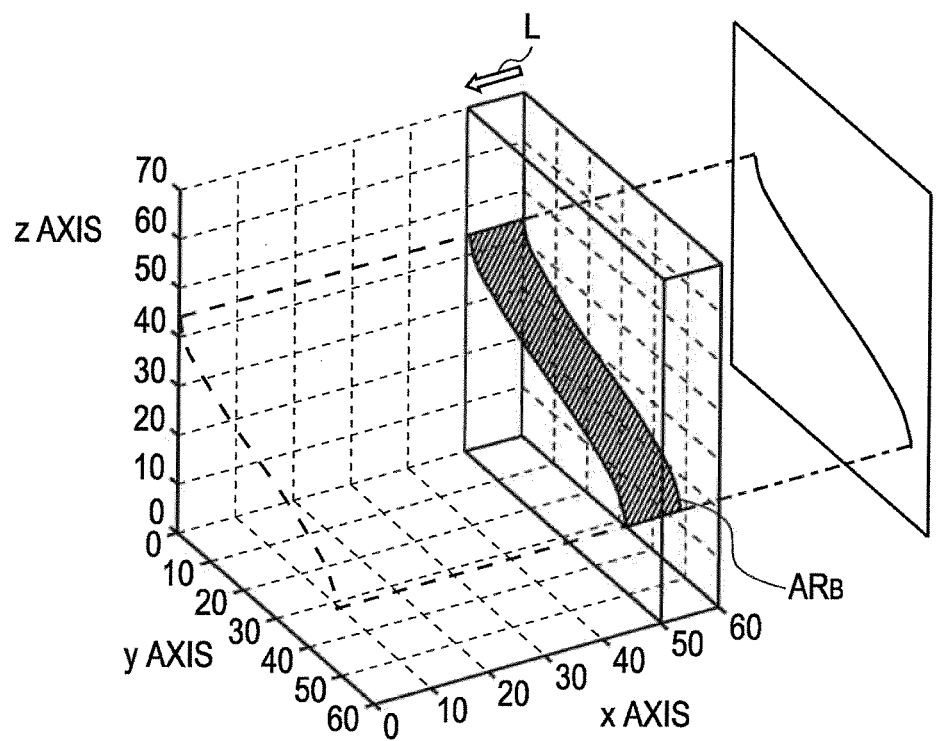
FIG. 16 is a schematic diagram for explaining detection (1) of a silhouette region of blood vessels.

In other words, when the blood vessel image partial data item $DBd_2$ that is first input from the blood vessel extraction unit 24 is considered as a process target, the three-dimensional image generating unit 26 places a binary blood vessel image based on the blood vessel image partial data item $DBd_2$ as a reference image at a position corresponding to a viewpoint at which a rotation angle is 0 [°] among the viewpoints in the surroundings of the voxel space, for example, as illustrated in FIG. 16, and detects only a silhouette region $AR_B$ that is projected into a space (a space bordered with solid lines) ranging from a projection surface of the projection space to a projection face that is a defined length L distant in a direction toward an innermost portion of the projection space. Note that a method for detecting a silhouette region is the same as the method which is performed for a finger image.

On the other hand, when a blood vessel image partial data item $DBe_4$, $DBe_6$, . . . that is input from the blood vessel extraction unit 24 after the first blood vessel image partial data item $DBe_2$ is input is considered as a process target, the three-dimensional image generating unit 26 recognizes a rotation movement amount from the reference image to a binary blood vessel image on the basis of the corresponding movement amount data item DBM that is input from the movement-amount calculation unit 25.

Then, when the rotation movement amount is denoted by $V_{x2}$ and a value that is set as a distance from the rotation axis of the finger to the blood vessels is denoted by r2, the following equation is obtained.

$$\theta_{ro2} = \arctan(V_{x2}/r2) \quad (2)$$

Using the equation, the three-dimensional image generating unit 26 obtains a first rotation angel $\theta_{ro2}$ of the binary blood vessel image with respect to the reference image.

In this manner, the three-dimensional image generating unit 26 detects silhouette regions that are projected into spaces ranging from projection surfaces of the projection space to projection faces which are the defined length L distant in directions toward innermost portions of the projection space, as in the case of the finger stereoscopic image, for the blood vessels which are shown in the binary blood vessel images that are process targets until a binary blood vessel image with which the first rotation angle $\theta_{ro2}$ becomes 360 [°] or larger is processed as a process target.

Figure 17:
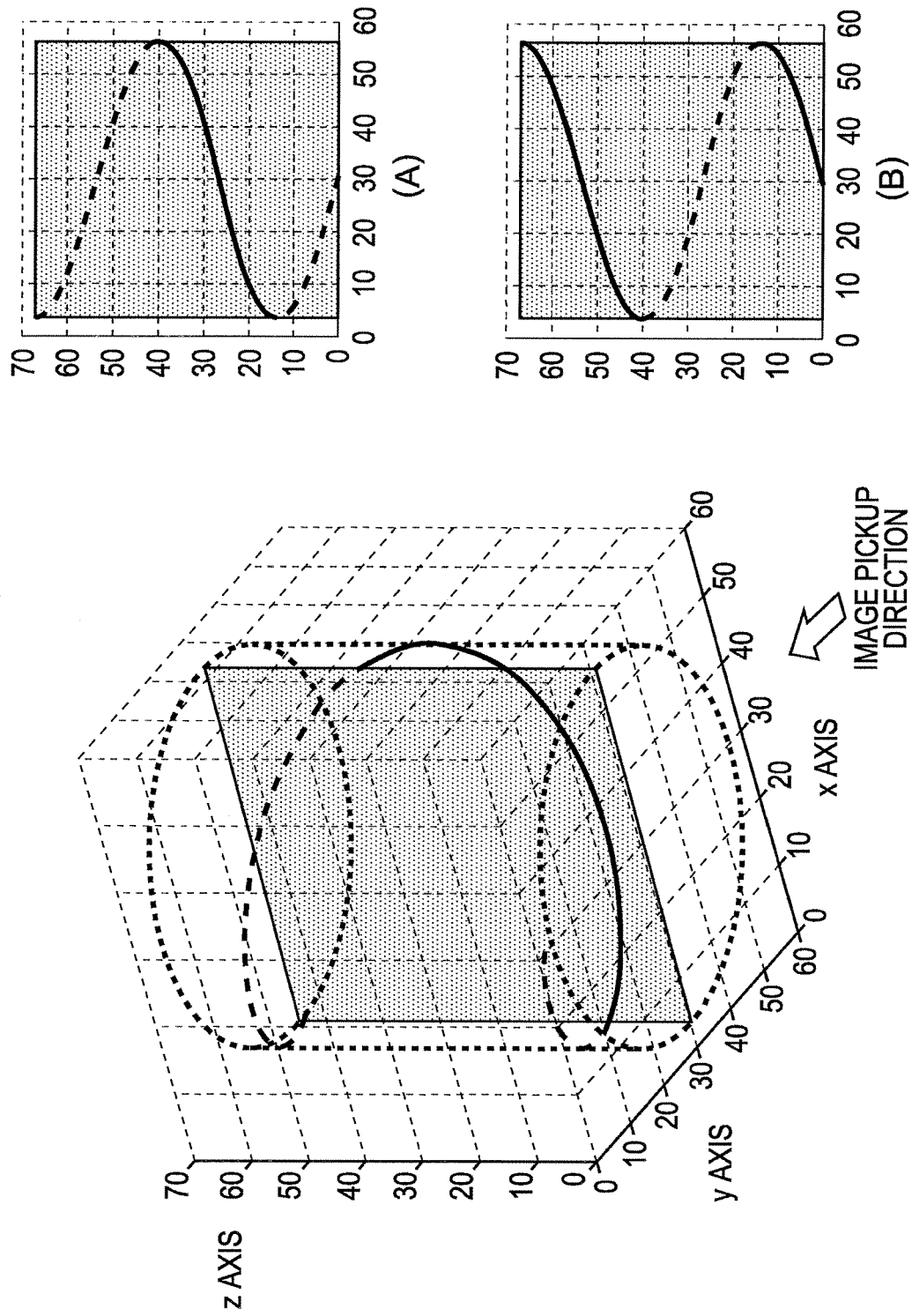
FIG. 17 includes schematic diagrams for explaining relationships between an object and object images that are shown in images (A) at a side in an image pickup direction (a front side of the object) and (B) at a side in a direction opposite to the image pickup direction (a backside of the object).
Figure 18:
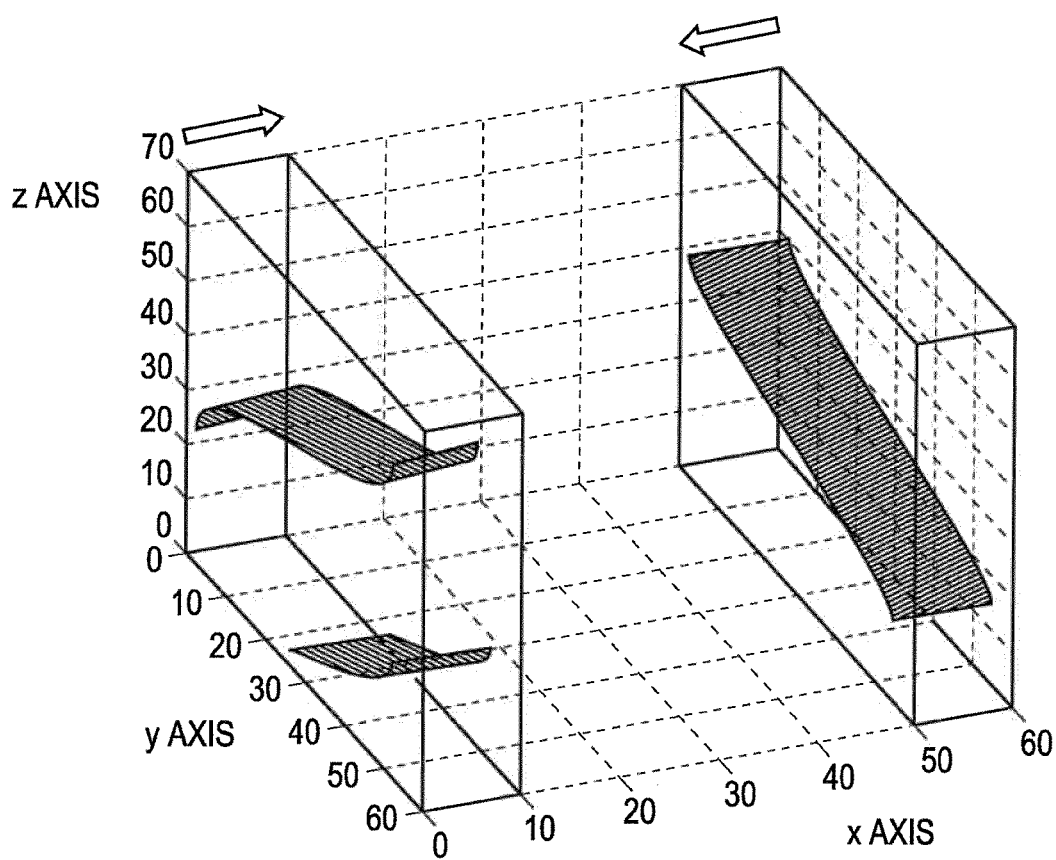
FIG. 18 is a schematic diagram for explaining detection (2) of silhouette regions of the blood vessels.

Here, portions other than blood vessels in a living body are not hollowed, and are blocked with individual tissues such as fat. Accordingly, there is a case in which the optical image pickup section 12 cannot pick up an image of blood vessel portions that exist at a side of the back side of the image pickup surface, for example, as illustrated in FIG. 17. Even in this case, because a target to detect a silhouette region is limited to a region, into which the silhouette region is projected, raining from a projection surface of the voxel space (the projection space) to a projection face which is the defined length distant in a direction toward an innermost portion of the voxel space, voxels of projected portions (silhouette regions) for the object that is shown in the individual images are left in the voxel space as illustrated in FIG. 18.

Figure 19:
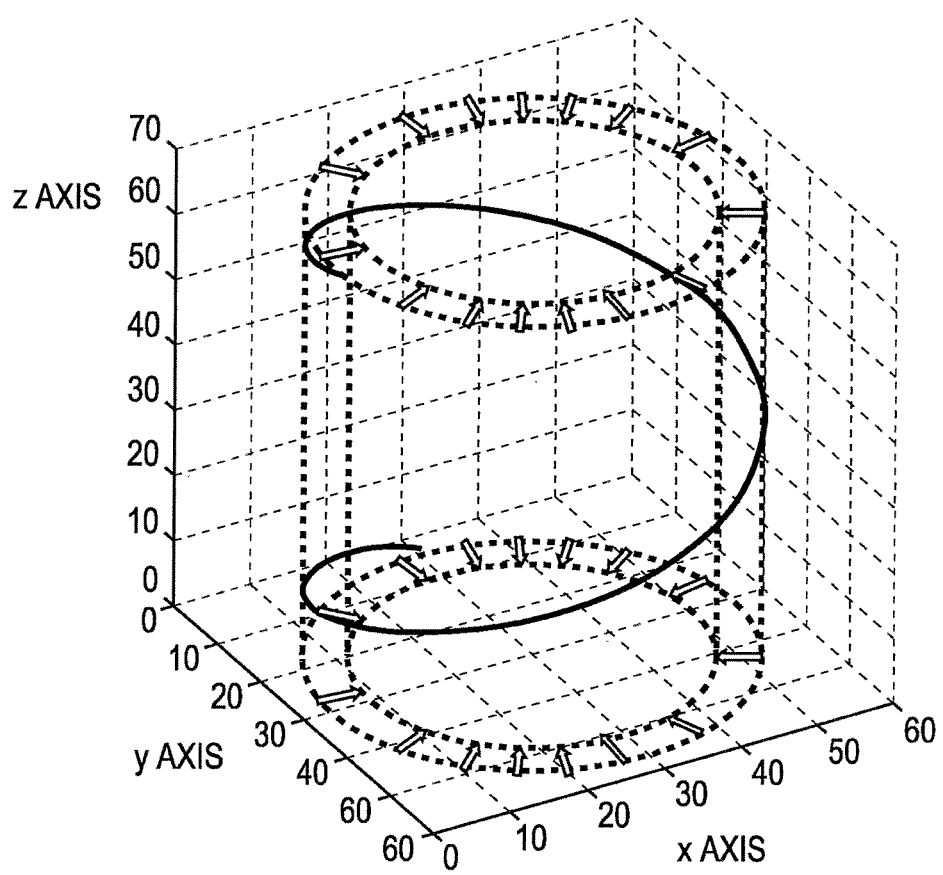
FIG. 19 is a schematic diagram illustrating a state in which silhouette regions of the blood vessels are extracted.

Accordingly, when silhouette regions are detected until the first rotation angle $\theta_{ro2}$ with respect to the reference image becomes 360 [°] or larger, common portions (portions shaded with solid lines) of the voxels that are left as the projected portions (the silhouette regions) for the object which is shown in the individual images are extracted as a blood vessel stereoscopic image (a three-dimensional volume), which is faithfully reproduced for the actual object, in the voxel space, for example, as illustrated in FIG. 19. Note that, in FIG. 19, portions of a cylindrical region are voxels that are left as unprojected portions.

Figure 20:
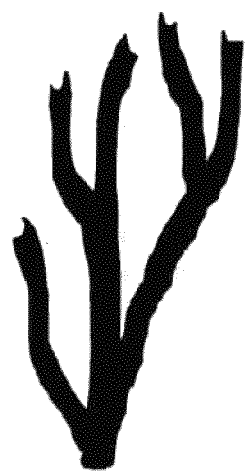
FIG. 20 is a schematic diagram illustrating a blood vessel stereoscopic image.

The three-dimensional image generating unit 26 is configured to, when the first rotation angle $\theta_{ro2}$ with respect to the reference image becomes 360 [°] or larger, extract the common portions of the individual silhouette regions that have been detected as a blood vessel stereoscopic image (a three-dimensional volume), thereby generating the blood vessel stereoscopic image, for example, as illustrated in FIG. 20.

(4-7) Recognition of Cross Section Shapes of Stereoscopic Images

Figure 21:
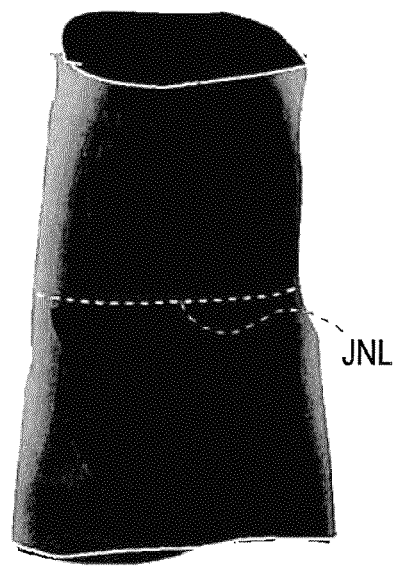
FIG. 21 is a schematic diagram illustrating the finger stereoscopic image and the blood vessel stereoscopic image that are generated in the voxel space.

When the shape extraction unit 27 obtains the three-dimensional volume data item DTD that is input from the three-dimensional image generating unit 26, the shape extraction unit 27 recognizes the finger stereoscopic image and the blood vessel stereoscopic image based on the three-dimensional volume data item DTD, and recognizes the position of the joint JNL of the finger stereoscopic image on the basis of the position data item $DP_i$ that is input from the finger joint detection unit 21, for example, as illustrated in FIG. 21.

Then, the shape extraction unit 27 considers the position of the joint JNL as a reference, extracts cross-section shape values on a plurality of cross sections having predetermined positional relationships with respect to the position of the joint, and generates the individual cross-section shape values as identification data items DIS. In the blood vessel registration mode, the identification data items DIS are registered in the memory 13, and in the authentication mode, the identification data items DIS are verified against identification data items that are registered in the memory 13.

Figure 22:
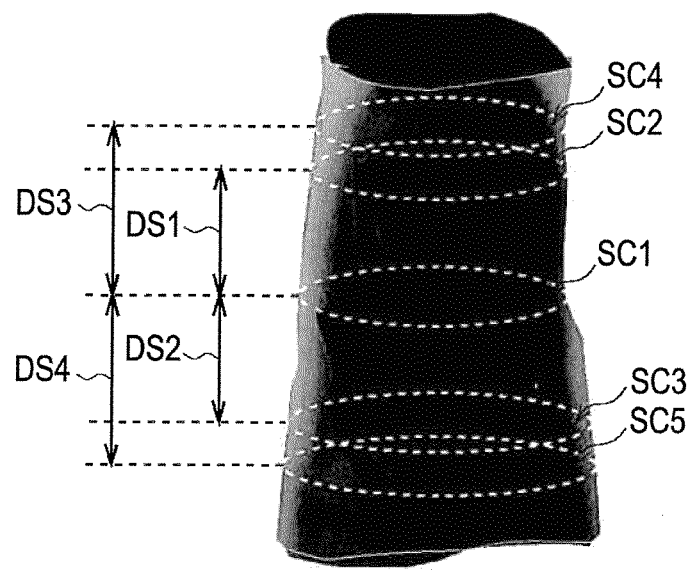
FIG. 22 is a schematic diagram for explaining determination of cross sections with respect to the joint.

An example of a method for extracting cross-section shape values that is performed by the shape extraction unit 27 will be explained. The shape extraction unit 27 determines, as targets to extract cross-section shape values, a cross section SC1, which passes through the position of the joint and which is parallel to the joint, cross sections SC2 and SC3, which pass through positions that are first distances DS1 and DS2 distant from the position of the joint in a direction orthogonal to the joint (the longitudinal direction of the finger) and which are parallel to the joint, and cross sections SC4 and SC5, which pass through positions that are second distances DS3 and DS4, the second distances DS3 and DS4 being longer than the first distances, distant from the position of the joint in the longitudinal direction of the finger and which are parallel to the joint, for example, as illustrated in FIG. 22.

Figure 23:
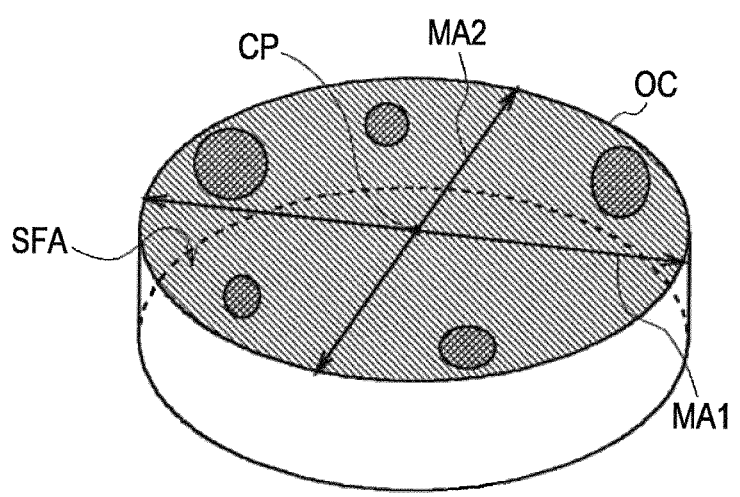
FIG. 23 is a schematic diagram for explaining extraction of cross-section shape values.

And, for each of the cross sections SC1 to SC5, the shape extraction unit 27 is configured to obtain an outer periphery OC of the cross section, a surface area SFA, a central position CP, a major axis MA1 and a minor axis MA2 that pass through the central position CP, and positions of the blood vessels that exist in the cross section (illustrated using diagonal lines in the figure) as cross-section shape values, for example, as illustrated in FIG. 23, thereby extracting the cross-section shape values.

(5) Operations and Advantages

With the above-described configuration, the control section 10 of the authentication device 1 generates, from the plurality of finger images obtained from the viewpoints in the surroundings of the living body portion, common portions of silhouettes of the finger that is shown in the images as the finger stereoscopic image (FIG. 15) in the target space (FIG. 12).

Furthermore, the control section 10 generates, from the plurality of blood vessel images obtained from the viewpoints in the surroundings of the living body portion, common portions of silhouettes of the blood vessels inside the finger that are shown in the images as the blood vessel stereoscopic image (FIG. 20) in the target space (FIG. 12).

Then, the control section 10 extracts, as identification data items, the positions of the blood vessels (illustrated using diagonal lines in FIG. 23) in the cross sections having the predetermined relationships with respect to the position of the joint JNL (FIG. 21) of the finger stereoscopic image.

Accordingly, the control section 10 extracts the identification data items as items representing shapes of portions having fixed relationships with respect to the finger stereoscopic image simultaneously with representation of a shape of one portion of the blood vessel stereoscopic image. Thus, the control section 10 can discretely express both the finger stereoscopic image and the blood vessel stereoscopic image using the positions of the blood vessels. As a result, the control section 10 can improve authentication accuracy simultaneously with reduction of the amount of information concerning the identification target, compared with a case in which the finger stereoscopic image and the blood vessel stereoscopic image are simply considered as identification data items.

In this embodiment, not only the cross-section shape values representing shapes of the cross sections of the blood vessel stereoscopic image (the positions of the blood vessels), but also the cross-section shape values representing shapes of the cross sections of the finger stereoscopic image (the outer periphery OC, the surface area SFA, the central position CP, and the major axis MA1 and the minor axis MA2 that pass through the central position CP) are considered as the identification data items.

Furthermore, in this embodiment, regarding the identification data items, the cross-section shape values of both the finger stereoscopic image and the blood vessel stereoscopic image are considered as the identification data items for each of the five cross sections SC1 to SC5 (FIG. 22) having the predetermined positional relationships with respect to the position of the joint JNL (FIG. 21).

Accordingly, the control section 10 can express the structure of the finger in detail, and can markedly improve the authentication accuracy.

Moreover, before the control section 10 generates the finger stereoscopic image and the blood vessel stereoscopic image, the control section 10 detects the joint JNL of the finger that is shown in the finger images, and performs rotation correction on the finger images and the blood vessel images so that the angles defined by the row or column directions of the finger images and the blood vessel images and the extension directions of the joint JNL will be predetermined angles.

Accordingly, when the control section 10 generates the finger stereoscopic image or the blood vessel stereoscopic image, the control section 10 can accurately obtain the common portions of silhouettes of the finger or the blood vessels that are shown in the images from which the finger stereoscopic image or the blood vessel stereoscopic image is generated. As a result, the control section 10 can markedly improve the authentication accuracy.

In this embodiment, since the joint JNL is used as a reference for rotation correction as it is used as a reference for the cross sections, a processing load that is necessary until the finger stereoscopic image or the blood vessel stereoscopic image is generated can be reduced, compared with a case in which different items are used as the references.

Additionally, when the control section 10 generates the finger stereoscopic image and the blood vessel stereoscopic image, the control section 10 causes the near-infrared light source in the image pickup section 12 to perform the blink operation, thereby causing the image pickup section 12 to alternately pick up a finger image and a blood vessel image. Then, the control section 10 calculates, for the finger images and the blood vessel images, the movement amounts of the finger or the movement amounts of the blood vessels that are shown in images which are selected as calculation targets and in images which were input immediately before the above-mentioned images (FIG. 8 and so forth).

In this state, the control section 10 recognizes the viewpoints for the individual finger images and the individual blood vessel images from the movement amounts. When projection into the voxel space from the positions of the individual viewpoints for the images is performed for the finger or the blood vessels that are shown in the images, the control section 10 generates, as the finger stereoscopic image (FIG. 15) or the blood vessel stereoscopic image (FIG. 20), the common portions of projection regions (FIG. 13 or FIG. 16) that are projected into the voxel space.

Accordingly, the control section 10 can generate the finger stereoscopic image and the blood vessel stereoscopic image from the images that were picked up by one image pickup section 12. Thus, the authentication device 1 can be miniaturized, compared with a case in which a stereoscopic image is generated from images that were picked up by a plurality of cameras, and this is useful when the authentication device 1 is mounted in a mobile terminal apparatus such as a PDA or a mobile phone.

With this configuration, the positions of the blood vessels (illustrated using diagonal lines in FIG. 23) in the cross sections having the predetermined positional relationships with respect to the position of the joint JNL (FIG. 21) of the finger stereoscopic image among the finger stereoscopic image and the blood vessel stereoscopic image are extracted as identification data items, whereby the authentication device 1 that can discretely express both the finger stereoscopic image and the blood vessel stereoscopic image using the positions of the blood vessels and that can improve the authentication accuracy simultaneously with reduction of the amount of information concerning the identification target can be realized.

(6) Other Embodiments

In the above-described embodiment, a case is described, in which the values (the cross-section shape values) representing shapes of the plurality of cross sections SC1 to SC5 (FIG. 22) having the predetermined positional relationships with respect to the reference position are extracted. However, in the present invention, in addition to the case, a volume bordered by a pair of cross sections that are selected from among the cross sections and an outer shape of the finger may be extracted. Note that, regarding the pair of cross sections that should be selected, any combination may be used, for example, the cross sections SC1 and SC5, or the cross sections SC1 and SC2, and, additionally, two or more pairs of cross sections may be selected.

Furthermore, a case is described, in which the outer periphery OC of a cross section, the surface area SFA, the central position CP, the major axis MA1 and the minor axis MA2 that pass through the central position CP, and the positions of the blood vessels that exist in the cross section (illustrated using diagonal lines in the figure) are applied. However, some of these may be omitted. For example, a new item may be added, such as a central position of a blood vessel that exists in a cross section, an outer periphery, or a major axis and a minor axis that pass through the central position.

Note that, when registration is performed or when verification is performed, a target which should be extracted as a cross-section shape value may be input or selected via the operation section 11 (FIG. 1), and that the input or selected cross-section shape value may be extracted. In this manner, because the extraction details for a cross-section shape value or the number of cross-section shape values that are to be extracted can be considered as an accompanying secret information item that only a user can know, the authentication accuracy can be markedly improved simultaneously with reduction of the amount of information concerning the identification target.

Additionally, degrees of importance are provided for the plurality of cross-section shape values (the outer periphery OC of a cross section, the surface area SFA, the central position CP, the major axis MA1 and the minor axis MA2 that pass through the central position CP, and the positions of the blood vessels that exist in the cross section). The higher the degree of importance of a cross-section shape value, the higher the degree of influence on determination of whether or not a person is approved as registrant, that is assigned to the cross-section shape value may be. In this manner, when verification is performed, a person can be approved as a registrant (disapproved as a registrant) simply by successful matching (unsuccessful matching) of a cross-section shape value having a high degree of importance even when matching of a cross-section shape value having a low degree of importance is unsuccessful (successful). Thus, the authentication accuracy can be markedly improved simultaneously with reduction of the amount of information concerning the identification target.

In addition, regarding the number of cross sections that are targets to extract cross-section shape values, in the above-described embodiment, a case is described, in which the five cross sections SC1 to SC5 are applied. However, the present invention is not limited to the above-described embodiment. One, two, or more cross sections may be applied.

Note that, when registration is performed or when verification is performed, the number of cross sections to be extracted may be input or selected via the operation section 11 (FIG. 1), and that cross-section shape values of cross sections which are applied in accordance with the input or selected number of cross sections to be extracted may be extracted. In this manner, because the number of cross sections to be extracted can be considered as an accompanying secret information item that only a user can know, the authentication accuracy can be markedly improved simultaneously with reduction of the amount of information concerning the identification target.

Furthermore, regarding the positional relationships that the cross sections have with respect to the reference position, in the above-described embodiment, the cross section SC1, which passes through the position of the joint and which is parallel to the joint, the cross sections SC2 and SC3, which pass through positions that are the first distances DS1 and DS2 distant from the position of the joint in the direction orthogonal to the joint (the longitudinal direction of the finger) and which are parallel to the joint, and the cross sections SC4 and SC5, which pass through positions that are the second distances DS3 and DS4, the second distances DS3 and DS4 being longer than the first distances, distant from the position of the joint in the longitudinal direction of the finger and which are parallel to the joint, are used. However, the present invention is not limited to the above-described embodiment. Positional relationships other than the above-mentioned positional relationships may be used.

For example, all of or some of the cross sections SC1 to SC5 may be changed to cross sections so that predetermined angles are defined by the cross sections and a face which is parallel to the joint. Moreover, a finger tip or the like may be used as the reference position instead of the position of the joint. Furthermore, for example, when images of a palm are employed instead of the finger images, the reference position is appropriately changed in accordance with a type of image of an employed living body portion, and examples of the reference position include a line on the palm.

Note that the positional relationships may be prepared as a plurality of patterns, and that a cross section having a pattern of a positional relationship with respect to the reference position that is selected from among the patterns may be extracted. In this manner, because the position of a cross section from which a cross-section shape value should be extracted can be changed in accordance with a user selection, the position of a cross section can be considered as an accompanying secret information item that only a user can know. As a result, the authentication accuracy can be markedly improved simultaneously with reduction of the amount of information concerning the identification target.

In the above-described embodiment, a case is described, in which the finger images are applied as the plurality of first images obtained from the viewpoints in the surroundings of the living body portion. However, the present invention is not limited to the above-described embodiment. Images of a palm, a toe, an arm, an eye, an arm, or the like can be applied.

In the above-described embodiment, a case is described, in which the blood vessel images are applied as the plurality of second images obtained from the viewpoints in the surroundings of the living body portion. However, the present invention is not limited to the above-described embodiment. For example, nerves can be applied. Note that, although the second images are obtained by an optical camera (the image pickup section 12 (FIG. 1)) that is mounted in the authentication device 1, the second images may be obtained by a device different from the authentication, device 1, e.g., an image pickup device that picks up, using X-rays, an image of blood vessels into which a contrast medium is injected.

In the above-described embodiment, as a method for obtaining alternately a blood vessel image and a finger image, a method is used, in which the near-infrared light source in the image pickup section 12 is caused to blink only in predetermined blink periods that are provided every other predetermined interval. However, the present invention is not limited to the above-described embodiment. For example, an optical filter that transmits only visible light may be placed at a predetermined position on an optical axis only in predetermined placement periods that are provided every other predetermined interval. Moreover, if positional relationships between the viewpoints and the finger circumferential face can be specified, blood vessel images and finger images may be obtained at different times, and then may be sorted. Examples of such a method include a method in which the finger is inserted into a cylindrical member, and in which images of the finger are picked up along the finger circumferential face by a plurality of cameras.

Additionally, in the above-described embodiment, a case is described, in which the blood vessel registration mode and the authentication mode are performed in accordance with the programs that are stored in the ROM. However, the present invention is not limited to the above-described embodiment. The blood vessel registration mode and the authentication mode may be preformed in accordance with programs that are obtained by being installed from a storage medium in which the programs are stored, such as a CD (Compact Disc), a DVD (Digital Versatile Disc), or a semiconductor memory, or by being downloaded from a server which supplies the programs on the Internet.

Moreover, in the above-described embodiment, a case is described, in which the control section 10 performs a registration process and an authentication process. However, the present invention is not limited to the above-described embodiment. One portion of the processes may be performed by a graphics workstation.

In addition, in the above-described embodiment, a case is described, in which the authentication device 1 having an image pickup function, a verification function, and a registration function is applied. However, the present invention is not limited to the above-described embodiment. The functions which are separated in accordance with applications so that each of the functions or some of the functions are incorporated into a single device may be applied.

INDUSTRIAL APPLICABILITY

The present invention can be utilized in the field of biometrics authentication.

The invention claimed is:

1. An information extraction method comprising:
a first step of generating, from a plurality of first images obtained via visible light from viewpoints in surroundings of a living body portion, common portions of silhouettes of the living body portion that is shown in the images as a first stereoscopic image in a target space, and of generating, from a plurality of second images obtained via near-infrared light from the viewpoints in the surroundings of the living body portion, common portions of silhouettes of an inner surface image of the living body portion that is shown in the images as a second stereoscopic image in the target space, wherein the plurality of first images and the plurality of second images are alternately obtained; and
a second step of extracting, as an identification information item, a value representing a shape of a cross section of the second stereoscopic image that has a predetermined positional relationship with respect to a reference position of the first stereoscopic image.

2. The information extraction method according to claim 1, characterized in that
the living body portion is a finger, and the inner surface image of the living body portion is blood vessels.

3. The information extraction method according to claim 1, characterized in that,
in the second step,
a value representing a shape of a cross section of the first stereoscopic image and the second stereoscopic image that has a predetermined positional relationship with respect to the reference position of the first stereoscopic image is extracted as an identification information item.

4. The information extraction method according to claim 3, characterized in that,
in the second step,
a position corresponding to a joint is recognized from the first stereoscopic image, and a value representing a shape of a cross section of the second stereoscopic image that has a predetermined positional relationship with respect to the position is extracted as an identification information item.

5. The information extraction method according to claim 1, characterized in that,
in the second step,
the value includes a plurality of values, the plurality of values are obtained for each of a plurality of cross sections of the second stereoscopic image that have predetermined positional relationships with respect to the reference position, and the values are extracted as identification information items.

6. The information extraction method according to claim 1, characterized in that,
in the second step,
the positional relationship includes a plurality of patterns of positional relationships, and a cross section having a positional relationship with respect to the reference position that corresponds to a pattern selected from among the plurality of patterns of positional relationships is extracted.

7. The information extraction method according to claim 1, further comprising:
a detection step of detecting, from the first images, a joint of the living body portion that is shown in the images; and
a rotation correction step of performing rotation correction on the plurality of first images and the second images so that angles defined by row or column directions of the images and extension directions of the joint are predetermined angles,
wherein, in the first step,
the first stereoscopic image is generated from the individual first images that have been subjected to rotation correction, and the second stereoscopic image is generated from the individual second images that have been subjected to rotation correction.

8. The information extraction method according to claim 1, further comprising:
an image pickup step of causing image pickup means to alternately pick up each of the first images and a corresponding one of the second images; and a calculation step of calculating movement amounts of the living body portion or movement amounts of the inner surface image that is shown in images which are selected as calculation targets and in images which have been input immediately before the images, wherein, in the first step, the viewpoints for the plurality of first images and the plurality of second images are recognized from the movement amounts, and, when projection into the target space from positions of the individual viewpoints for the images is performed for the living body portion or the inner surface image that is shown in the images, common portions of projection regions that are projected into the target space are generated as the first stereoscopic image or the second stereoscopic image.

9. An information extraction device characterized by comprising:

a work memory; and an image processing unit that performs image processing with the work memory, wherein the image processing unit performs generation of, from a plurality of first images obtained via visible light from viewpoints in surroundings of a living body portion, common portions of silhouettes of the living body portion that is shown in the images as a first stereoscopic image in a target space, and generation of, from a plurality of second images obtained via near-infrared light from the viewpoints in the surroundings of the living body portion, common portions of silhouettes of an inner surface image of the living body portion that is shown in the images as a second stereoscopic image in the target space, wherein the plurality of first images and the plurality of second images are alternately obtained; and extraction of, as an identification information item, a value representing a shape of a cross section of the second stereoscopic image that has a predetermined positional relationship with respect to a reference position of the first stereoscopic image.

10. A non-transitory computer-readable medium storing a computer program configured to cause a control unit to control a work memory to perform:

generation of, from a plurality of first images obtained via visible light from viewpoints in surroundings of a living body portion, common portions of silhouettes of the living body portion that is shown in the images as a first stereoscopic image in a target space, and generation of, from a plurality of second images obtained via near-infrared light from the viewpoints in the surroundings of the living body portion, common portions of silhouettes of an inner surface image of the living body portion that is shown in the images as a second stereoscopic image in the target space, wherein the plurality of first imaqes and the plurality of second images are alternately obtained; and extraction of, as an identification information item, a value representing a shape of a cross section of the second stereoscopic image that has a predetermined positional relationship with respect to a reference position of the first stereoscopic image.

11. A registration device comprising:

a generating unit configured to generate, from a plurality of first images obtained via visible light from viewpoints in surroundings of a living body portion, common portions of silhouettes of the living body portion that is shown in the images as a first stereoscopic image in a target space, and to generate, from a plurality of second images obtained via near-infrared light from the viewpoints in the surroundings of the living body portion, common portions of silhouettes of an inner surface image of the living body portion that is shown in the images as a second stereoscopic image in the target space, wherein the plurality of first images and the plurality of second images are alternately obtained;

an extraction unit configured to extract, as an identification information item, a value representing a shape of a cross section of the second stereoscopic image generated by the generating unit that has a predetermined positional relationship with respect to a reference position of the first stereoscopic image generated by the generating unit; and a registration unit configured to register the value extracted by the extraction unit as an identification information item in a storage medium.

12. A verification device comprising:

a generating unit configured to generate, from a plurality of first images obtained via near-infrared light from viewpoints in surroundings of a living body portion, common portions of silhouettes of the living body portion that is shown in the images as a first stereoscopic image in a target space, and to generate, from a plurality of second images obtained via near-infrared light from the viewpoints in the surroundings of the living body portion, common portions of silhouettes of an inner surface image of the living body portion that is shown in the images as a second stereoscopic image in the target space, wherein the plurality of first images and the plurality of second images are alternately obtained;

an extraction unit configured to extract, as an identification information item, a value representing a shape of a cross section of the second stereoscopic image generated by the generating unit that has a predetermined positional relationship with respect to a reference position of the first stereoscopic image generated by the generating unit; and a verification unit configured to verify the value extracted by the extraction unit against a value registered in a storage medium as an identification information item.

* * * * *